United States Patent
Tan et al.

(10) Patent No.: US 12,543,023 B2
(45) Date of Patent: Feb. 3, 2026

(54) COMMUNICATION METHOD AND COMMUNICATION APPARATUS

(71) Applicant: HUAWEI TECHNOLOGIES CO., LTD., Guangdong (CN)

(72) Inventors: Jiayao Tan, Shenzhen (CN); Junren Chang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 18/169,881

(22) Filed: Feb. 16, 2023

(65) Prior Publication Data
US 2023/0199438 A1  Jun. 22, 2023

Related U.S. Application Data

(63) Continuation of application No. PCT/CN2020/112236, filed on Aug. 28, 2020.

(51) Int. Cl.
*H04W 4/06* (2009.01)
*H04W 36/00* (2009.01)

(52) U.S. Cl.
CPC ......... *H04W 4/06* (2013.01); *H04W 36/0055* (2013.01)

(58) Field of Classification Search
CPC ............... H04W 4/06; H04W 36/0055; H04W 36/008357; H04W 36/0007
See application file for complete search history.

(56) References Cited

U.S. PATENT DOCUMENTS

| 2011/0149827 | A1 | 6/2011 | Na et al. |
| 2018/0132146 | A1* | 5/2018 | Lee ................... H04W 36/0007 |
| 2022/0046389 | A1* | 2/2022 | Shrivastava ............ H04W 4/06 |
| 2023/0179963 | A1* | 6/2023 | Fujishiro ............... H04W 48/12 370/328 |
| 2023/0309185 | A1* | 9/2023 | Hori ....................... H04W 76/30 |

FOREIGN PATENT DOCUMENTS

| CN | 1859762 A | 11/2006 |
| CN | 101448290 A | 6/2009 |
| CN | 102413431 A | 4/2012 |

* cited by examiner

*Primary Examiner* — Sharmin Chowdhury

(57) ABSTRACT

This application provides a communication method and a communication apparatus. The method includes: A terminal device receives first information, where the first information includes first indication information and/or second configuration information, the first indication information is used to indicate that the second configuration information is the same as or different from first configuration information, the second configuration information is configuration information corresponding to a first service in a second cell, the first configuration information is configuration information corresponding to the first service in a first cell, and the second cell is a neighboring cell of the first cell; and the terminal device receives, based on the first information, data of the first service provided by the second cell. In this way, a service delay can be reduced and service continuity can be improved.

18 Claims, 4 Drawing Sheets

S210: Receive first information in a first cell, where the first information includes first indication information and/or second configuration information S220: Move from coverage of the first cell to coverage of a second cell S230: Receive, based on the first information, data of a first service provided by the second cell

COMMUNICATION METHOD AND COMMUNICATION APPARATUS

CROSS-REFERENCE TO RELATED APPLICATIONS

This application is a continuation of International Application No. PCT/CN2020/112236, filed on Aug. 28, 2020, the disclosure of which is hereby incorporated by reference in its entirety.

TECHNICAL FIELD

This application relates to the communication field, and more specifically, to a communication method and a communication apparatus.

BACKGROUND

Multimedia broadcast multicast services (multimedia broadcast multicast services, MBMSs or MBSs) are services that face a plurality of terminal devices, for example, radio broadcast services, television broadcast services, some public security services, and batch software update services. The MBMS can reduce network pressure caused by a rapid increase in a traffic volume, and improve public information transmission efficiency in a mobile network. When a terminal moves in a cell, different cells support or broadcast different MBMS. In this way, how to improve service continuity and provide better user experience when UE moves is a research hotspot of a person skilled in the art.

SUMMARY

This application provides a communication method and a communication apparatus, so that a service delay can be reduced and service continuity can be improved.

According to a first aspect, a communication method is provided. The method may be performed by a terminal device or a module (such as a chip) configured (or used) in the terminal device. The following uses an example in which the method is performed by the terminal device for description.

The method includes: The terminal device receives first information from a first cell, where the first information includes first indication information and/or second configuration information, the first indication information is used to indicate that the second configuration information is the same as or different from first configuration information, the second configuration information is configuration information corresponding to a first service in a second cell, and the first configuration information is configuration information corresponding to the first service in the first cell; and the terminal device receives, based on the first information, data of the first service provided by the second cell.

Optionally, the first cell is a serving cell of the terminal device, and the second cell is a neighboring cell of the first cell.

According to the foregoing solution, the terminal device obtains, in the serving cell (which may be referred to as a source cell), related information of the first service in the neighboring cell, so that after moving to the neighboring cell (which may be referred to as a target cell), the terminal device can determine, based on the related information that is of the first service in the target cell and that is provided by the source cell, a manner of obtaining the first service in the target cell. In this way, a delay in obtaining service data by the terminal device can be reduced, and service continuity can be improved.

With reference to the first aspect, in some implementations of the first aspect, the first information includes the first indication information, and that the terminal device receives, based on the first information, data of the first service provided by the second cell includes: When the second configuration information is the same as the first configuration information, the terminal device receives, based on the first configuration information, the data of the first service provided by the second cell; when the second configuration information is different from the first configuration information, and the first information includes the second configuration information, the terminal device receives, based on the second configuration information, the data of the first service provided by the second cell; or when the second configuration information is different from the first configuration information, and the first information does not include the second configuration information, the terminal device receives the second configuration information from the second cell, and receives the data of the first service provided by the second cell.

With reference to the first aspect, in some implementations of the first aspect, the first information is carried in transmission channel information of the first service from the first cell.

With reference to the first aspect, in some implementations of the first aspect, the first indication information includes a first bit string, one bit in the first bit string corresponds to one or more neighboring cells of the first cell, and the one bit is used to indicate that configuration information corresponding to the first service in the one or more neighboring cells is the same as or different from the first configuration information.

With reference to the first aspect, in some implementations of the first aspect, the transmission channel information further includes second information, the second information is used to indicate M neighboring cells that are in a first neighboring cell and that provide the first service, and the first neighboring cell is a neighboring cell that is of the first cell and that is indicated in control channel information of the first service in the first cell; and the one bit in the first bit string corresponds to one or more first neighboring cells, and the first neighboring cell includes the second cell; or the one bit in the first bit string corresponds to one or more neighboring cells in the M neighboring cells, and the M neighboring cells include the second cell.

With reference to the first aspect, in some implementations of the first aspect, the configuration information corresponding to the first service includes N pieces of sub-configuration information, the first indication information includes a second bit string, the second bit string includes at least one bit field, one bit field corresponds to one or more neighboring cells of the first cell, and one bit in the one bit field is used to indicate that first sub-configuration information in the one or more neighboring cells is the same as or different from the first sub-configuration information in the first cell; and the first sub-configuration information is one of the N pieces of sub-configuration information.

With reference to the first aspect, in some implementations of the first aspect, the transmission channel information further includes second information, the second information is used to indicate M neighboring cells that are in a first neighboring cell and that provide the first service, and the first neighboring cell is a neighboring cell that is of the first cell and that is indicated in control channel information of the first service in the first cell; and the one bit field in the second bit string corresponds to one or more first neighboring cells, and the first neighboring cell includes the second cell; or the one bit field in the second bit string corresponds to one or more neighboring cells in the M neighboring cells, and the M neighboring cells include the second cell.

With reference to the first aspect, in some implementations of the first aspect, the transmission channel information includes neighboring cell information of the first service, the neighboring cell information includes second cell information, and the first information is carried in the second cell information.

With reference to the first aspect, in some implementations of the first aspect, the configuration information corresponding to the first service includes N pieces of sub-configuration information, the first indication information further includes N pieces of sub-indication information, the N pieces of sub-indication information correspond to the N pieces of sub-configuration information, and one piece of sub-indication information is used to indicate that first sub-configuration information in the second cell is the same as or different from the first sub-configuration information in the first cell; and the first sub-configuration information is one of the N pieces of sub-configuration information.

With reference to the first aspect, in some implementations of the first aspect, the configuration information corresponding to the first service is one or more of the following information:
  a first group radio network temporary identifier G-RNTI corresponding to the first service;
  scheduling information of a control channel of the first service; and
  scheduling information of a transmission channel of the first service.

With reference to the first aspect, in some implementations of the first aspect, the terminal device is in an idle state or in an inactive state, and/or the first service is a multimedia broadcast multicast service.

According to a second aspect, a communication method is provided. The method may be performed by a network device or a module (such as a chip) configured (or used) in the network device. The following uses an example in which the method is performed by the network device for description.

The method includes: sending first information to a terminal device, where the first information includes first indication information and/or second configuration information, the first indication information is used to indicate that the second configuration information is the same as or different from first configuration information, the second configuration information is configuration information corresponding to a first service in a second cell, and the first configuration information is configuration information corresponding to the first service in a first cell.

Optionally, the first cell is a serving cell of the terminal device, and the second cell is a neighboring cell of the first cell.

According to the foregoing solution, the serving cell (which may be referred to as a source cell) provides related information of the first service for the accessed terminal device, so that after moving to the neighboring cell (which may be referred to as a target cell), the terminal device can determine, based on the related information that is of the first service in the target cell and that is provided by the source cell, a manner of obtaining the first service in the target cell. In this way, a delay in obtaining service data by the terminal device can be reduced, and service continuity can be improved.

With reference to the second aspect, in some implementations of the second aspect, the first information is carried in transmission channel information that is of the first service and that is sent by the first cell to the terminal device.

With reference to the second aspect, in some implementations of the second aspect, the first indication information includes a first bit string, one bit in the first bit string corresponds to one or more neighboring cells of the first cell, and the one bit is used to indicate that configuration information corresponding to the first service provided by the one or more neighboring cells is the same as or different from the first configuration information.

With reference to the second aspect, in some implementations of the second aspect, the transmission channel information further includes second information, the second information is used to indicate M neighboring cells that are in a first neighboring cell and that provide the first service, and the first neighboring cell is a neighboring cell that is of the first cell and that is indicated in control channel information of the first service in the first cell; and the one bit in the first bit string corresponds to one or more first neighboring cells, and the first neighboring cell includes the second cell; or the one bit in the first bit string corresponds to one or more neighboring cells in the M neighboring cells, and the M neighboring cells include the second cell.

With reference to the second aspect, in some implementations of the second aspect, the configuration information corresponding to the first service includes N pieces of sub-configuration information, the first indication information includes a second bit string, the second bit string includes at least one bit field, one bit field corresponds to one or more neighboring cells of the first cell, and one bit in the one bit field is used to indicate that first sub-configuration information in the one or more neighboring cells is the same as or different from the first sub-configuration information in the first cell; and the first sub-configuration information is one of the N pieces of sub-configuration information.

With reference to the second aspect, in some implementations of the second aspect, the transmission channel information further includes second information, the second information is used to indicate M neighboring cells that are in a first neighboring cell and that provide the first service, and the first neighboring cell is a neighboring cell that is of the first cell and that is indicated in control channel information of the first service in the first cell; and the one bit field in the second bit string corresponds to one or more first neighboring cells, and the first neighboring cell includes the second cell; or the one bit field in the second bit string corresponds to one or more neighboring cells in the M neighboring cells, and the M neighboring cells include the second cell.

With reference to the second aspect, in some implementations of the second aspect, the transmission channel information includes neighboring cell information of the first service, the neighboring cell information includes second cell information, and the first information is carried in the second cell information.

With reference to the second aspect, in some implementations of the second aspect, the configuration information corresponding to the first service includes N pieces of sub-configuration information, the first indication information further includes N pieces of sub-indication information, the N pieces of sub-indication information correspond to the N pieces of sub-configuration information, and one piece of sub-indication information is used to indicate that first sub-configuration information in the second cell is the same as or different from the first sub-configuration information in the first cell; and the first sub-configuration information is one of the N pieces of sub-configuration information.

With reference to the second aspect, in some implementations of the second aspect, the configuration information corresponding to the first service is one or more of the following information:
 a first group radio network temporary identifier G-RNTI corresponding to the first service;
 scheduling information of a control channel of the first service; and
 scheduling information of a transmission channel of the first service.

With reference to the second aspect, in some implementations of the second aspect, the terminal device is in an idle state or in an inactive state, and/or the first service is a multimedia broadcast multicast service.

According to a third aspect, a communication apparatus is provided. The apparatus includes: a transceiver unit, configured to receive first information from a first cell, where the first information includes first indication information and/or second configuration information, the first indication information is used to indicate that the second configuration information is the same as or different from first configuration information, the second configuration information is configuration information corresponding to a first service in a second cell, and the first configuration information is configuration information corresponding to the first service in the first cell; and a processing unit, configured to read the first information, where the transceiver unit is further configured to receive, based on the first information, data of the first service provided by the second cell.

Optionally, the first cell is a serving cell of the terminal device, and the second cell is a neighboring cell of the first cell.

According to a fourth aspect, a communication apparatus is provided. The apparatus includes: a processing unit, configured to determine first information, where the first information includes first indication information and/or second configuration information, the first indication information is used to indicate that the second configuration information is the same as or different from first configuration information, the second configuration information is configuration information corresponding to a first service provided by a second cell, and the first configuration information is configuration information corresponding to the first service provided by a first cell; and a transceiver unit, configured to send the first information to a terminal device.

Optionally, the first cell is a serving cell of the terminal device, and the second cell is a neighboring cell of the first cell.

According to a fifth aspect, a communication apparatus is provided. The apparatus includes a processor. The processor is coupled to a memory, and may be configured to execute instructions in the memory, to implement the method according to any one of the first aspect and the possible implementations of the first aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip configured in a terminal device. When the communication apparatus is the chip configured in the terminal device, the communication interface may be an input/output interface.

Optionally, the transceiver may be a transceiver circuit. Optionally, the input/output interface may be an input/output circuit.

According to a sixth aspect, a communication apparatus is provided. The apparatus includes a processor. The processor is coupled to a memory, and may be configured to execute instructions in the memory, to implement the method according to any one of the second aspect and the possible implementations of the second aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip configured in a network device. When the communication apparatus is the chip configured in the network device, the communication interface may be an input/output interface.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to: receive a signal through the input circuit, and transmit a signal through the output circuit, so that the processor performs the method according to any one of the first aspect or the second aspect and the possible implementations of the first aspect or the second aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to an eighth aspect, a processing apparatus is provided. The apparatus includes a processor and a memory. The processor is configured to: read instructions stored in the memory, receive a signal through a receiver, and transmit a signal through a transmitter, to perform the method according to any one of the first aspect or the second aspect and the possible implementations of the first aspect or the second aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read only memory, ROM). The memory and the processor may be integrated into a same chip, or may be disposed on different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver machine.

The processing apparatus in the eighth aspect may be one or more chips. The processor in the processing apparatus may be implemented by using hardware, or may be implemented by using software. When being implemented by using the hardware, the processor may be a logic circuit, an integrated circuit, or the like. When being implemented by using the software, the processor may be a general-purpose processor, and is implemented by reading software code stored in the memory. The memory may be integrated into the processor, may be located outside the processor, and exists independently.

According to a ninth aspect, a computer program product is provided. The computer program product includes a computer program (which may also be referred to as code or instructions). When the computer program is run, a computer is enabled to perform the method according to any one of the first aspect or the second aspect and the possible implementations of the first aspect or the second aspect.

According to a tenth aspect, a computer-readable storage medium is provided. The computer-readable storage medium stores a computer program (which may also be referred to as code or instructions). When the computer program is run on a computer, the computer is enabled to perform the method according to any one of the first aspect or the second aspect and the possible implementations of the first aspect or the second aspect.

According to an eleventh aspect, a communication system is provided. The system includes the foregoing terminal device and network device.

DESCRIPTION OF EMBODIMENTS

Technical solutions in embodiments of this application may be applied to various communication systems, for example, a global system for mobile communication (global system for mobile communication, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a 5th generation (5th generation, 5G) communication system, a new radio (new radio, NR) access technology communication system, a vehicle-to-X (vehicle-to-X, V2X) communication system, an internet of vehicles communication system, a machine type communication (machine type communication, MTC) communication system, and an internet of things (internet of things, IoT) communication system.

Figure 1:
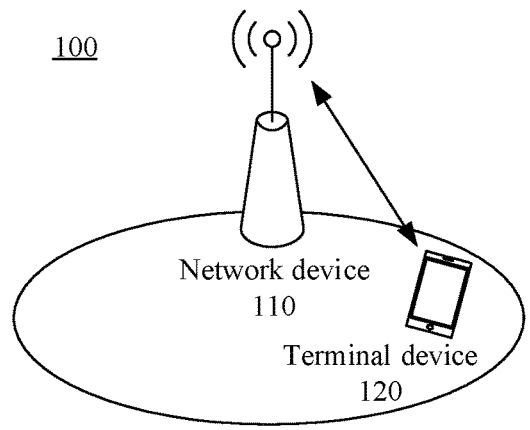
FIG. 1 is a schematic diagram of a wireless communication system 100 to which an embodiment of this application is applicable.

FIG. 1 is a schematic diagram of a wireless communication system 100 to which an embodiment of this application is applicable.

As shown in FIG. 1, the wireless communication system 100 may include at least one network device, for example, a network device 110 shown in FIG. 1. The wireless communication system 100 may further include at least one terminal device, for example, a terminal device 120 shown in FIG. 1. The network device 110 may provide, for the terminal device 120, related information of a first service provided by a neighboring cell, so that after moving to the neighboring cell, the terminal device 120 may determine, based on the related information of the first service, a manner of receiving data of the first service.

The terminal device in embodiments of this application may also be referred to as user equipment (user equipment, UE), an access terminal, a subscriber unit, a subscriber station, a mobile station, a remote station, a remote terminal, a mobile device, a user terminal, a terminal, a wireless communication device, a user agent, a user apparatus, or the like. The terminal device in embodiments of this application may be a mobile phone, a tablet computer, a computer with a wireless transceiver function, a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in transportation security, a wireless terminal in a smart city, a wireless terminal in a smart home, a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal device in a 5G network or a terminal device in a future evolved public land mobile network (public land mobile network, PLMN), or the like.

It should be understood that a specific form of the terminal device is not limited in this application.

The network device in embodiments of this application may be any device with a wireless transceiver function. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP) or a transmission reception point (transmission reception point, TRP), or the like; or may be a gNB or a transmission point (TRP or TP) in a 5G (for example, NR) system, or one or a group of antenna panels (including a plurality of antenna panels) of a base station in a 5G system; or may be a network node constituting a gNB or a transmission point, for example, a baseband unit (BBU) or a distributed unit (distributed unit, DU).

In some deployment, the gNB may include a central unit (central unit, CU) and the DU. The gNB may further include an active antenna unit (active antenna unit, AAU for short). The CU implements a part of functions of the gNB, and the DU implements a part of functions of the gNB. For example, the CU is responsible for processing a non-real-time protocol and service, and implementing functions of a radio resource control (radio resource control, RRC) layer and a packet data convergence protocol (packet data convergence protocol, PDCP) layer. The DU is responsible for processing a physical layer protocol and a real-time service, and implementing functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the AAU. It may be understood that the network device may be a device including one or more of the CU node, the DU node, and the AAU node. In addition, the CU may be classified into a network device in an access network (radio access network, RAN), or the CU may be classified into a network device in a core network (core network, CN). This is not limited in this application.

The network device manages one or more cells and provides a service for the managed cell. The terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cell herein may include a metro cell (metro cell), a micro cell (micro cell), a pico cell (pico cell), a femto cell (femto cell), and the like. These small cells are characterized by small coverage and low transmit power, and are applicable to providing a high-rate data transmission service.

This application provides a communication method. A terminal device obtains, in a serving cell (which may be referred to as a source cell), related information of a first service in a neighboring cell, so that after moving to the neighboring cell (which may be referred to as a target cell), the terminal device can determine, based on the related information that is of the first service in the target cell and that is provided by the source cell, a manner of obtaining the first service in the target cell. For example, the terminal device receives data of the first service in the target cell based on configuration information corresponding to the first service in the source cell; or receives data of the first service based on configuration information, corresponding to the first service in the target cell, included in the related information; or receives configuration information of the first service in the target cell, to receive data of the first service provided by the target cell. In this way, a delay in obtaining service data by the terminal device can be reduced.

It should be noted that a cell on which the terminal device camps may be referred to as a current cell or a serving cell. To be specific, when the terminal device camps on the source cell, the source cell may be referred to as a current cell or a serving cell. When the terminal device moves to coverage of the target cell, the target cell may be referred to as a current cell or a serving cell.

The following describes in detail the communication method provided in embodiments of this application with reference to the accompanying drawings.

Figure 2:
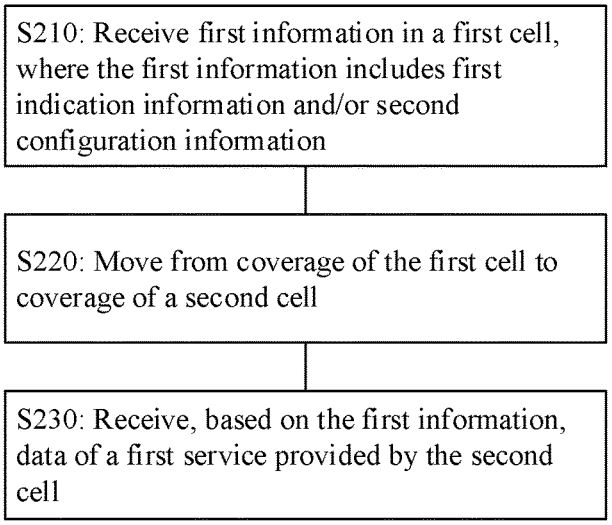
FIG. 2 is a schematic flowchart of a communication method according to an embodiment of this application.

FIG. 2 is a schematic flowchart of a communication method according to an embodiment of this application.

S210: A terminal device receives first information in a first cell, where the first information includes first indication information and/or second configuration information.

The first cell is a serving cell or a current cell of the terminal device. The first information is sent by a network device that manages the first cell. The first indication information is used to indicate that the second configuration information is the same as or different from first configuration information, the first configuration information is configuration information corresponding to a first service provided by the first cell, and the second configuration information is configuration information corresponding to the first service provided by a second cell. The second cell is a neighboring cell of the first cell.

The first cell provides the first service, and the network device that manages the first cell sends, to the terminal device in the first cell, the configuration information corresponding to the first service, namely, the first configuration information. The terminal device may receive, in the first cell based on the first configuration information, data of the first service provided by the first cell. The second cell may also provide the first service, and a network device that manages the second cell (which may be the same as or different from the network device that manages the first cell) sends, to the terminal device in the second cell, the configuration information corresponding to the first service, namely, the second configuration information. In this embodiment of this application, the terminal device receives the first information from the first cell, and the terminal device determines, based on the first indication information in the first information and/or the second configuration information in the first information, that the first configuration information is the same as or different from the second configuration information. The terminal device obtains, within coverage of the first cell by using the first information received from the first cell, the configuration information corresponding to the first service in the second cell. In other words, the terminal device may obtain related information of the first service in the neighboring cell even if the terminal device does not enter coverage of the neighboring cell, so that after moving from the coverage of the first cell to the coverage of the second cell, the terminal device may receive, based on the first information, data of the first service provided by the second cell.

In this application, a first service provided by a cell may be understood as a first service being provided or a first service that can be provided. Configuration information corresponding to a first service provided by a cell may be understood as configuration information corresponding to a first service being provided by the cell, or configuration information corresponding to a first service that can be provided by the cell.

In an implementation, the first information includes the first indication information, and the first indication information indicates that the first configuration information is the same as the second configuration information.

The network device notifies the terminal device by using the first indication information that the first configuration information is the same as the second configuration information, and the terminal device determines, based on the first indication information, that the first configuration information is the same as the second configuration information. If the terminal device moves from the coverage of the first cell to the coverage of the second cell, the terminal device may receive, based on the first configuration information received in the first cell, the data of the first service provided by the second cell.

In another implementation, the first information includes the first indication information, the first indication information indicates that the first configuration information is different from the second configuration information, and the first information includes the second configuration information.

When the first configuration information is different from the second configuration information, the network device notifies the terminal device by using the first indication information that the first configuration information is different from the second configuration information, and may notify, in the first information, the terminal device of the second configuration information corresponding to the first service in the second cell. If the terminal device moves from the coverage of the first cell to the coverage of the second cell, the terminal device may receive, based on the second configuration information obtained in the first cell, the data of the first service provided by the second cell.

In another implementation, the first indication information indicates that the first configuration information is different from the second configuration information, and the first information does not include the second configuration information.

When the first configuration information is different from the second configuration information, the network device notifies the terminal device by using the first indication information that the first configuration information is different from the second configuration information, and the first information does not include the second configuration information. The terminal device determines, based on the first information, that the second configuration information needs to be received in the second cell, and receives the data of the first service based on the second configuration information.

In another implementation, the first indication information indicates that the first configuration information is different from the second configuration information, and the first information includes the second configuration information.

The network device sends, to the terminal device, the second configuration information corresponding to the first service provided by the second cell, and the terminal device may receive, based on the second configuration information obtained in the first cell, the data of the first service provided by the second cell.

By way of example, and not limitation, the first service is an MBS, and may be specifically an MBS in a single-cell (single cell, SC) point-to-multipoint (point-to-multipoint, PTM) transmission manner.

Optionally, the first information may be carried in transmission channel information that corresponds to the first service provided by the first cell and that is sent by the network device.

Optionally, the configuration information corresponding to the configuration information of the first service may be one or more of the following:

a group radio network temporary identifier (group radio network temporary identifier, G-RNTI) corresponding to the first service, scheduling information of a control channel (control channel, CCH) of the first service, or scheduling information of a transmission channel (transmission channel, TCH) of the first service.

During specific implementation, the first indication information may include but is not limited to the following two indication manners:

Manner 1: The first indication information includes a bit string, and the bit string is used to indicate that configuration information corresponding to the first service provided by one or more neighboring cells of the first cell is the same as or different from the first configuration information.

Optionally, the first indication information includes a first bit string, one bit in the first bit string corresponds to the one or more neighboring cells of the first cell, and the one bit is used to indicate that the configuration information corresponding to the first service provided by the corresponding one or more neighboring cells is the same as or different from the first configuration information.

In an implementation, control channel information corresponding to the first service provided by the first cell indicates Q first neighboring cells; and the one bit in the first bit string corresponds to one or more first neighboring cells, where Q is an integer greater than or equal to 0. Optionally, the Q neighboring cells may be cells that provide single-cell point-to-multipoint services.

In another implementation, the transmission channel information corresponding to the first service provided by the first cell includes second information, and the second information indicates M neighboring cells that are in the Q first neighboring cells and that provide the first service; and the one bit in the first bit string corresponds to one or more neighboring cells in the M neighboring cells, where M is an integer less than or equal to N and greater than or equal to 0. Optionally, the Q neighboring cells may be cells that provide single-cell point-to-multipoint MBSs.

Optionally, one bit in the first bit string corresponds to one neighboring cell. Optionally, a quantity of bits in the first bit string is equal to a quantity Q of first neighboring cells, or a quantity of bits in the first bit string is equal to a quantity M of M neighboring cells indicated by the second information.

For example, the first bit string includes five bits, one bit corresponds to one neighboring cell, and each bit is used to indicate that configuration information corresponding to the first service provided by one neighboring cell is the same as or different from the first configuration information; and one bit in the five bits corresponds to the second cell, and is used to indicate that the second configuration information is the same as or different from the first configuration information. For example, the configuration information of the first service may be a G-RNTI corresponding to an MBS. If one bit corresponding to the second cell is set to "1", it indicates that the G-RNTI corresponding to the MBS in the first cell is the same as a G-RNTI corresponding to the MBS in the second cell; or if one bit corresponding to the second cell is set to "0", it indicates that the G-RNTI corresponding to the MBS in the first cell is different from a G-RNTI corresponding to the MBS in the second cell. Alternatively, conversely, if one bit corresponding to the second cell is set to "1", it indicates that the G-RNTI corresponding to the MBS in the first cell is different from a G-RNTI corresponding to the MBS in the second cell; or if one bit corresponding to the second cell is set to "0", it indicates that the G-RNTI corresponding to the MBS in the first cell is the same as a G-RNTI corresponding to the MBS in the second cell. For example, the first indication information may be represented as:

g-RNTI-neighbourCell BIT STRING (P), where
g-RNTI-neighbourCell indicates that the first indication information indicates that the G-RNTIs of the MBS provided by the neighboring cell of the first cell are the same or different, BIT STRING is the first bit string, and P indicates a quantity of bits included in the first bit string. Optionally, P may be equal to the quantity Q of first neighboring cells. Optionally, the quantity Q may be represented as SIZE (maxNeighCell-SCPTM), namely, the quantity of cells that support single-cell point-to-multipoint. In this case, P may be replaced with SIZE (maxNeighCell-SCPTM). That is, the first indication information may be represented as:
g-RNTI-neighbourCell BIT STRING (SIZE (maxNeighCell-SCPTM)), where
optionally, P may be equal to the quantity M of M neighboring cells indicated by second information. Optionally, M may be represented as SIZE (maxNeighCell-SCPTMSupport), namely, the quantity of M neighboring cells that support the first service. In this case, P may be replaced with SIZE (maxNeighCell-SCPTMSupport). That is, the first indication information may be represented as:
g-RNTI-neighbourCell BIT STRING (SIZE (maxNeighCell-SCPTMSupport)).

For another example, if the first service is an MBS, configuration information of the MBS includes a G-RNTI, scheduling information of a transmission channel, scheduling information of a control channel, and the like that correspond to the MBS. Each piece of configuration information in the configuration information of the MBS may be indicated by using this implementation. To be specific, each piece of configuration information in the configuration information of the MBS corresponds to one bit string, and is used to indicate that the configuration information of one neighboring cell is the same as or different from the configuration information in the first configuration information, where the bit string corresponding to each piece of configuration information includes one bit corresponding to the second cell. The indication information may be represented as follows:

g-RNTI-neighbourCell BIT STRING (P),
sc-mcch-neighbourCellscheduling BIT STRING (P), and
sc-mtch-neighbourCellscheduling BIT STRING (P), where
g-RNTI-neighbourCell is used to indicate that the G-RNTI of the MBS provided by the neighboring cell is the same as or different from a G-RNTI in the first configuration information, sc-mcch-neighbourCellscheduling is used to indicate that the scheduling information of the control channel corresponding to the MBS provided by the neighboring cell of the first cell is the same as or different from scheduling information of the control channel in the first configuration information, and sc-mtch-neighbourCellscheduling is used to indicate that the scheduling information of the transmission channel corresponding to the MBS provided by the neighboring cell of the first cell is the same as or different from scheduling information of the transmission channel in the first configuration information. Optionally, the quantity P of bit strings may be equal to the quantity Q of first cells, and then P may be replaced with SIZE (maxNeighCell-SCPTM); or the quantity P may be equal to the quantity M of M neighboring cells indicated by the second information, and then P may be replaced with SIZE (maxNeighCell-SCPTMSupport). For example, P=10, where the fourth bit in the bit string corresponding to each piece of configuration information in the configuration information of the MBS corresponds to the second cell; and if the bit is set to "1", it indicates that the configuration information is the same as that in the first configuration information, or if the bit is set to "0", it indicates that the configuration information is different from that in the first configuration information. For example, if the fourth bit in the bit string corresponding to the G-RNTI is set to "0", the fourth bit in the bit string corresponding to the scheduling information of the transmission channel is set to "1", and the fourth bit in the bit string corresponding to the scheduling information of the transmission channel is set to "1", it indicates that the G-RNTI corresponding to the MBS provided by the second cell is different from a G-RNTI corresponding to the MBS provided by the first cell, and the scheduling information of the control channel and the scheduling information of the transmission channel that correspond to the MBS provided by the second cell are respectively the same as scheduling information of the control channel and scheduling information of the transmission channel in the first cell. However, this application is not limited thereto.

For another example, if the first service is an MBS, configuration information of the MBS includes a G-RNTI, scheduling information of a transmission channel, scheduling information of a control channel, and the like that correspond to the MBS. If a bit, corresponding to the second cell, in the first bit string is set to "1", it indicates that each piece of information in configuration information of the MBS in the first cell is the same as each piece of information in configuration information of the MBS in the second cell. In other words, the G-RNTIs, the scheduling information of the transmission channel, and the scheduling information of the control information of the MBS are the same in the first cell and the second cell. If the bit is set to "0", it indicates that each piece of information in the configuration information of the MBS in the first cell is different from each piece of information in the configuration information of the MBS in the second cell; or if the bit is set to "0", it indicates that at least one piece of information of the configuration information of the MBS in the first cell is different from that in the configuration information of the MBS. However, this application is not limited thereto.

Optionally, one bit in the first bit string corresponds to one or more neighboring cells of the first cell, the neighboring cells of the first cell are grouped, the one bit in the first bit string corresponds to a group of cells, and a quantity of bits in the first bit string is the same as a quantity of groups in which the neighboring cells are grouped.

In an implementation, the Q first neighboring cells are divided into one or more groups of cells, the one bit in the first bit string corresponds to one of the groups of cells, and the quantity of bits in the first bit string is less than or equal to Q.

In another implementation, the M neighboring cells indicated by the second information are divided into one or more groups of cells, the one bit in the first bit string corresponds to one of the groups of cells in the first bit string, and the quantity of bits in the first bit string is less than or equal to M.

For example, the one bit in the first bit string corresponds to a group of neighboring cells. If the one bit is set to "1", it indicates that configuration information of the first service provided by a group of cells corresponding to the bit is the same as the first configuration information. If the one bit is set to "0", it indicates that configuration information of the first service provided by a group of cells corresponding to the bit is different from the first configuration information; or if the one bit is set to "0", it indicates that configuration information of the first service provided by at least one cell in a group of cells corresponding to the bit is different from the first configuration information. For example, the first bit string includes three bits, each bit corresponds to a group of cells, and the second cell belongs to a group of cells corresponding to the first bit. If the three bits are represented as "101", and the first bit is set to "1", it indicates that configuration information corresponding to the first service provided by the group of cells to which the second cell belongs is the same as the first configuration information. However, this application is not limited thereto.

For another example, one bit in the first bit string corresponds to a group of neighboring cells of the first cell, the first service is an MBS, and the configuration information includes a G-RNTI, scheduling information of a transmission channel, scheduling information of a control channel, and the like. The one bit in the first bit string is used to indicate that each piece of information in configuration information corresponding to the MBS provided by a group of cells corresponding to the bit is the same as each piece of information in the first configuration information, or that at least one piece of information in configuration information corresponding to the MBS provided by a group of cells corresponding to the bit is different from corresponding information in the first configuration information. For example, the first bit string includes four bits, each bit corresponds to a group of cells, and the second cell belongs to a group of cells corresponding to the second bit. If the four bits are represented as "1001", and the second bit is set to "0", it indicates that at least one piece of information in a G-RNTI, scheduling information of a transmission channel, and scheduling information of a control channel that correspond to the MBS provided by the group of cells to which the second cell belongs is different from corresponding information in the first configuration information. For example, a G-RNTI corresponding to the MBS provided by one cell in the group of cells to which the second cell belongs is different from a G-RNTI in the first configuration information. In this case, a bit corresponding to the group of cells is set to "0". If the fourth bit in the first bit string is set to "1", it indicates that a G-RNTI, scheduling information of a transmission channel, scheduling information of a control channel that correspond to the MBS provided by a group of cells corresponding to the fourth bit is the same as a G-RNTI, scheduling information of a transmission channel, and scheduling information of a control channel in the first configuration information.

For another example, one bit in the first bit string corresponds to a group of neighboring cells of the first cell, the first service is an MBS, and the configuration information includes a G-RNTI, scheduling information of a transmission channel, scheduling information of a control channel, and the like. Each piece of configuration information corresponds to one bit string. Each piece of configuration information corresponds to one bit in the one bit string, and is used to indicate that configuration information corresponding to the MBS provided by a group of cells corresponding to the bit is the same as or different from that in the first configuration information. The bit string corresponding to each piece of configuration information includes four bits, and is used to indicate that configuration information of four groups of cells is the same as or different from that in the first configuration information. The second cell belongs to a group of cells corresponding to the third bit in the four bits. For example, if the four bits corresponding to the G-RNTI are "0000", and the third bit is set to "0", it indicates that the G-RNTI corresponding to the MBS provided by the group of cells to which the second cell belongs is different from a G-RNTI in the first configuration information. If the four bits corresponding to the scheduling information of the transmission channel are "1010", and the third bit is set to "1", it indicates that the scheduling information of the control channel corresponding to the MBS provided by the group of cells to which the second cell belongs is the same as scheduling information of the control channel in the first configuration information. In addition, if the four bits corresponding to the scheduling information of the control channel are "1000", and the third bit is set to "0", it indicates that the scheduling information of the transmission channel corresponding to the MBS provided by the group of cells to which the second cell belongs is different from scheduling information of the transmission channel in the first configuration information. However, this application is not limited thereto.

Optionally, the configuration information corresponding to the first service includes N pieces of sub-configuration information, the first indication information includes a second bit string, the second bit string includes at least one bit field, one bit field in the second bit string corresponds to one or more neighboring cells of the first cell, and one bit in the one bit field is used to indicate that first sub-configuration information in the one or more neighboring cells corresponding to the bit field in which the bit is located is the same as or different from first sub-configuration information in the first cell; and the first sub-configuration information is one of the N pieces of sub-configuration information.

In an implementation, the one bit field in the second bit string corresponds to one or more of first neighboring cells.

In another implementation, the one bit field in the second bit string corresponds to one or more neighboring cells in the M neighboring cells that are indicated by the second information and that provide the first service.

For example, the first service is an MBS, the configuration information of the MBS is scheduling information of a transmission channel, the scheduling information of the transmission channel includes three pieces of sub-configuration information, and the three pieces of sub-configuration information are respectively duration sub-configuration information, discontinuous reception inactive state sub-configuration information, and scheduling start offset sub-configuration information. The second bit string includes two bit fields, each bit field corresponds to one or more neighboring cells, one bit field includes three bits, and the three bits are in a one-to-one correspondence with the three pieces of sub-configuration information. For example, the second bit string is "110 001", where the first three bits are one bit field, the last three bits are one bit field, and the second cell corresponds to the first bit field, namely, the first three bits. The three bits in the bit field sequentially correspond to the duration sub-configuration information, the discontinuous reception inactive state sub-configuration information, and the scheduling start offset sub-configuration information. The bit field "110" indicates that the duration sub-configuration information in the scheduling information of the transmission channel corresponding to the MBS provided by the second cell is the same as duration sub-configuration information in the first configuration information, the discontinuous reception inactive state sub-configuration information is the same as discontinuous reception inactive state sub-configuration information in the first configuration information, and the scheduling start offset sub-configuration information is different from scheduling start offset sub-configuration information in the first configuration information. However, this application is not limited thereto. The first indication information may be represented as follows:

sc-mtch-neighbourCellscheduling BIT STRING (N*P),
where
N is a quantity of pieces of sub-configuration information, and "*" indicates multiplication. Optionally, P may be equal to the quantity Q of first neighboring cells, or P may be equal to the quantity M of M neighboring cells indicated by the second information, or P may be equal to the quantity of groups in which the neighboring cell are grouped.

For another example, the configuration information includes three pieces of configuration information: a G-RNTI, scheduling information of a transmission channel, and scheduling information of a control channel, and the scheduling information of the transmission channel further includes duration sub-configuration information, discontinuous reception inactive state sub-configuration information, and scheduling start offset sub-configuration information. The G-RNTI and the scheduling information of the control channel may be in an indication manner of the first bit string, the scheduling information of the transmission channel may be in an indication manner of the second bit string, and the indication information may be separately represented as follows:

g-RNTI-neighbourCell BIT STRING (P),
sc-mcch-neighbourCellscheduling BIT STRING (P), and
sc-mtch-neighbourCellscheduling BIT STRING (N*P),
where
a length of the bit string corresponding to the G-RNTI and a length of the bit string corresponding to the scheduling information of the control channel are P, and one bit in the bit string is used to indicate that configuration information of the corresponding neighboring cell is the same as or different from configuration information of the first configuration information. Optionally, P may be equal to the quantity Q of first neighboring cells, or P may be equal to the quantity M of M neighboring cells indicated by the second information, or P may be equal to the quantity of groups in which the neighboring cell are grouped. A length of the bit string corresponding to the scheduling information of the transmission channel is N*P, and one bit in the bit string is used to indicate that corresponding sub-configuration information in the corresponding neighboring cell is the same as or different from corresponding sub-configuration information in the first configuration information. However, this application is not limited thereto.

Manner 2: The transmission channel information corresponding to the first service provided by the first cell includes neighboring cell information of the first service, the neighboring cell information includes second cell information, and the first indication information is carried in the second cell information.

For example, the first service is an MBS, the transmission channel information of the MBS may be written as SC-MTCH-Info, and SC-MTCH-Info may be represented as follows:

```
SC-MTCH-Info::=SEQUENCE {
    sc-mtch-neighbourCell   SC-MTCH-NeighbourCellInfoList
},
``` where
SC-MTCH-Info includes a neighboring cell information list SC-MTCH-NeighbourCellInfoList, and the neighboring cell list includes one or more pieces of neighboring cell information (which may be written as SC-MTCH-NeighbourCellInfo). For example, a quantity of pieces of neighboring cell information in the neighboring cell list may be equal to a quantity M of M neighboring cells indicated by second information, and one piece of neighboring cell information is information about a neighboring cell in the M neighboring cells. It should be noted that the transmission channel information may further include other information that is not listed in this example, for example, the first configuration information. This is not limited in this application.

For example, the configuration information of the first service includes configuration information of a G-RNTI. The first indication information in the second cell information may be enumerated (enumerated) "Yes" or "No" to respectively indicate that the G-RNTI of the first service provided by the second cell is the same as or different from a G-RNTI in the first configuration information, and the second cell information may be represented as follows:

```
SC-MTCH-NeighbourCellInfo::=SEQUENCE {
    g-rnti-indication   ENUMERATED {true, false}
},
``` where
g-rnti-indication is used to indicate that the G-RNTI of the provided first service is the same as or different from the G-RNTI in the first configuration information. Alternatively, the first indication information in the second cell information may be a Boolean value indicating "Yes" or "No", to respectively indicate that the G-RNTI of the first service provided by the second cell is the same as or different from the G-RNTI in the first configuration information, and the second cell information may be represented as follows:

```
SC-MTCH-NeighbourCellInfo::=SEQUENCE {
    g-rnti-indication   BOOLEAN
},
``` where
alternatively, the first indication information may be one bit. If the bit is set to "1", it indicates that the G-RNTI of the first service provided by the second cell is the same as the G-RNTI of the first configuration information. If the bit is set to "0", it indicates that the G-RNTI of the first service provided by the second cell is different from the G-RNTI of the first configuration information. Alternatively, conversely, if the bit is set to "1", it indicates that the G-RNTI of the first service provided by the second cell is different from the G-RNTI of the first configuration information. If the bit is set to "0", it indicates that the G-RNTI of the first service provided by the second cell is the same as the G-RNTI of the first configuration information. This is not limited in this application.

For another example, the configuration information of the first service includes three pieces of configuration information: a G-RNTI, scheduling information of a transmission channel, and scheduling information of a control channel. When the first indication information in the second cell information is the same, it indicates that each piece of configuration information in the configuration information corresponding to the first service provided by the second cell is the same as that in the first configuration information. When the first indication information in the second cell information is different, it indicates that each piece of configuration information in the configuration information corresponding to the first service provided by the second cell is different from that in the first configuration information. Alternatively, each piece of configuration information in the configuration information of the first service corresponds to one piece of indication information, and is used to indicate that the indication information is the same as or different from indication information in the first configuration information. For example, the second cell information may be represented as follows:

```
SC-MTCH-NeighbourCellInfo::=SEQUENCE {
    g-rnti-indication              ENUMERATED {true, false}
    sc-mcch-neighbourCellscheduling    ENUMERATED {true, false}
    sc-mtch-neighbourCellscheduling    ENUMERATED {true, false}
},
``` where
  sc-mcch-neighbourCellscheduling is used to indicate that the scheduling information of the control channel corresponding to the provided first service is the same as or different from scheduling information of the control channel in the first configuration information, and sc-mtch-neighbourCellscheduling is used to indicate that the scheduling information of the transmission channel corresponding to the provided first service is the same as or different from scheduling information of the transmission channel in the first configuration information.

Optionally, the configuration information corresponding to the first service includes N pieces of sub-configuration information, the first indication information further includes N pieces of sub-indication information, the N pieces of sub-indication information correspond to the N pieces of sub-configuration information, one piece of sub-indication information is used to indicate that first sub-configuration information in the second cell is the same as or different from first sub-configuration information in the first cell; and the first sub-configuration information is one of the N pieces of sub-configuration information.

For example, the first service is an MBS, the configuration information of the MBS is scheduling information of a transmission channel, the scheduling information of the transmission channel includes three pieces of sub-configuration information, and the three pieces of sub-configuration information are respectively duration sub-configuration information (which may be written as onDurationTimerSCPTM), discontinuous reception (discontinuous reception, DRX) inactive state sub-configuration information (which may be written as drx-InactivityTimerSCPTM), and scheduling start offset sub-configuration information (which may be written as schedulingPeriodStartOffsetSCPTM). The first indication information in the second cell information includes three pieces of indication information, to respectively indicate that the three pieces of sub-configuration information of the first service provided by the second cell are the same as or different from three pieces of sub-configuration information in the first configuration information. For example, the second cell information may be represented as follows, and however this application is not limited thereto:

```
SC-MTCH-NeighbourCellInfo::=SEQUENCE {
    neighbourCell-onDurationTimerSCPTM          ENUMERATED {true, false}
    neighbourCell-drx-InactivityTimerSCPTM      ENUMERATED {true, false}
    neighbourCell-schedulingPeriodStartOffsetSCPTM   ENUMERATED {true, false}
},
or
SC-MTCH-NeighbourCellInfo::=SEQUENCE {
    sc-mtch-neighbourCellscheduling   neighbourCell-mtch-subinfo
},
neighbourCell-mtch-subinfo::=SEQUENCE {
    neighbourCell-onDurationTimerSCPTM          ENUMERATED {true, false}
    neighbourCell-drx-InactivityTimerSCPTM      ENUMERATED {true, false}
    neighbourCell-schedulingPeriodStartOffsetSCPTM   ENUMERATED {true, false}
}.
```

For another example, the configuration information includes three pieces of configuration information: a G-RNTI, scheduling information of a transmission channel, and scheduling information of a control channel, and the scheduling information of the transmission channel further includes duration sub-configuration information, discontinuous reception inactive state sub-configuration information, scheduling start offset sub-configuration information, and the like. The G-RNTI and the scheduling information of the transmission channel that correspond to the first service provided by the second cell may indicate, by using the indication information, that the G-RNTI and the scheduling information of the transmission channel are the same as or different from corresponding configuration information in the first configuration information. The indication information corresponding to the scheduling information of the transmission channel may include three pieces of sub-indication information, and the three pieces of sub-indication information separately indicate that the sub-configuration information is the same as or different from corresponding sub-configuration information in the first configuration information. For example, the second cell information may be represented as follows, and however this application is not limited thereto:

based on the first configuration information, the data of the first service provided by the second cell. When the second configuration information is different from the first configuration information, and the first information includes the second configuration information, the terminal device receives, based on the second configuration information in the first information, the data of the first service provided by the second cell. When the second configuration information is different from the first configuration information, and the first information does not include the second configuration information, the terminal device receives, in S230, the second configuration information sent by the network device that manages the second cell, and receives the data of the first service based on the second configuration information.

In another implementation, after receiving the first information in S210, the terminal device determines, based on whether the first information includes the second configuration information, a manner of receiving, in S230, the data of the first service provided by the second cell. When the first information includes the second configuration information, the terminal device receives, in S230 based on the second configuration information in the first information, the data of the first service provided by the second cell. When the first information does not include the second configu-

```
SC-MTCH-NeighbourCellInfo::=SEQUENCE {
    g-rnti-indication                           ENUMERATED {true, false}
    sc-mcch-neighbourCellscheduling             ENUMERATED {true, false}
    neighbourCell-onDurationTimerSCPTM          ENUMERATED {true, false}
    neighbourCell-drx-InactivityTimerSCPTM      ENUMERATED {true, false}
    neighbourCell-schedulingPeriodStartOffsetSCPTM   ENUMERATED {true, false}
},
or
SC-MTCH-NeighbourCellInfo::=SEQUENCE {
    g-rnti-indication                           ENUMERATED {true, false}
    sc-mcch-neighbourCellscheduling             ENUMERATED {true, false}
    sc-mtch-neighbourCellscheduling             neighbourCell-mtch-subinfo
},
neighbourCell-mtch-subinfo::=SEQUENCE {
    neighbourCell-onDurationTimerSCPTM          ENUMERATED {true, false}
    neighbourCell-drx-InactivityTimerSCPTM      ENUMERATED {true, false}
    neighbourCell-schedulingPeriodStartOffsetSCPTM   ENUMERATED {true, false}
}.
```

It should be noted that names and representation manners of the first indication information and the sub-indication information are merely examples, and each piece of information may further include other information. This is not limited in this application.

In this embodiment of this application, the MBS is used as an example for description, and the first service may be another service. This application is not limited thereto.

S220: The terminal device moves from the coverage of the first cell to a movement area of the second cell.

The first cell and the second cell may be different cells managed by a same network device, or may be different cells managed by different network devices. This is not limited in this application.

S230: The terminal device receives, based on the first information, the data of the first service provided by the second cell.

In an implementation, after receiving the first information in S210, the terminal device may determine, based on the first indication information in the first information, that the second configuration information is the same as or different from the first configuration information. When the second configuration information is the same as the first configuration information, the terminal device receives, in S230 ration information, the terminal device first receives, in S230, the second configuration information sent by the network device that manages the second cell, and then receives, based on the second configuration information, the data of the first service provided by the second cell.

According to the foregoing solution, the terminal device obtains, in the serving cell (which may be referred to as the source cell), the related information of the first service in the neighboring cell, so that after moving to the neighboring cell (which may be referred to as the target cell), the terminal device can determine, based on the related information that is of the first service in the target cell and that is provided by the source cell, a manner of obtaining the first service in the target cell. For example, the terminal device receives the data of the first service in the target cell based on the configuration information corresponding to the first service in the source cell; or receives the data of the first service based on the configuration information, corresponding to the first service in the target cell, included in the related information; or receives the configuration information of the first service in the target cell, to receive the data of the first service provided by the target cell. In this way, a delay in obtaining service data by the terminal device can be reduced.

The foregoing describes in detail the method provided in embodiments of this application with reference to FIG. 2.

Figure 3:
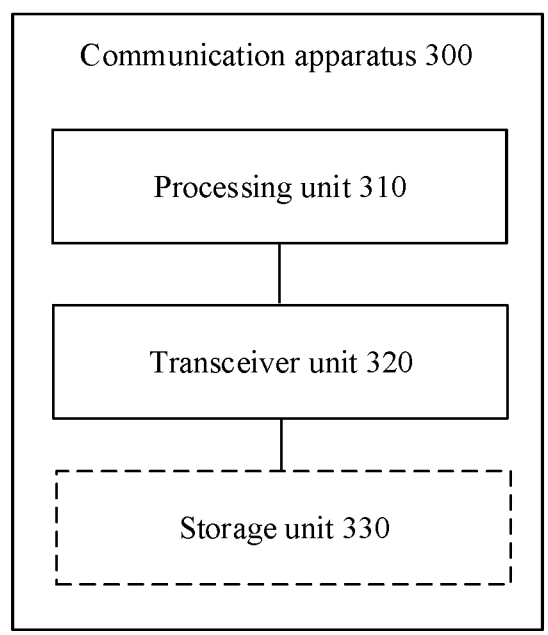
FIG. 3 is a schematic block diagram of an example of a communication apparatus according to this application.
Figure 4:
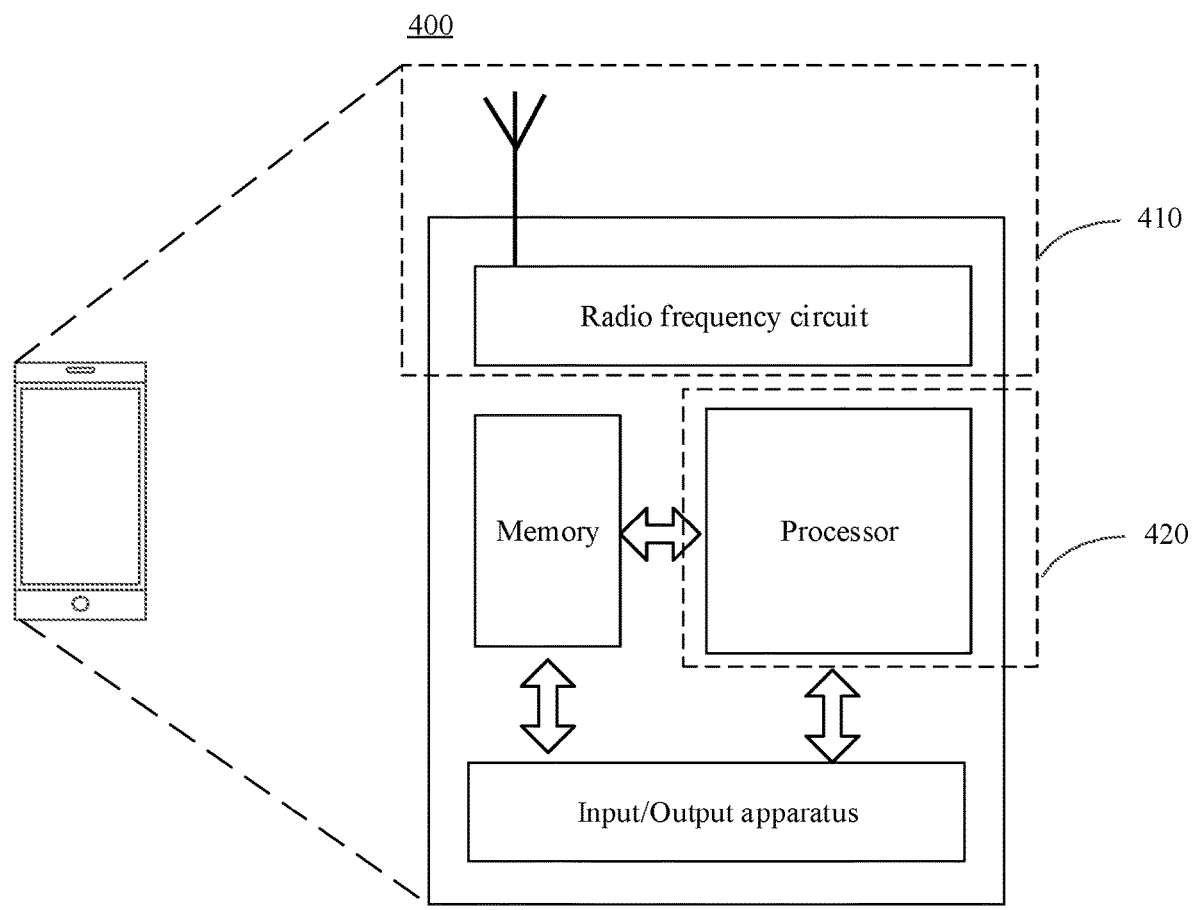
FIG. 4 is a schematic diagram of a structure of an example of a terminal device according to this application.
Figure 5:
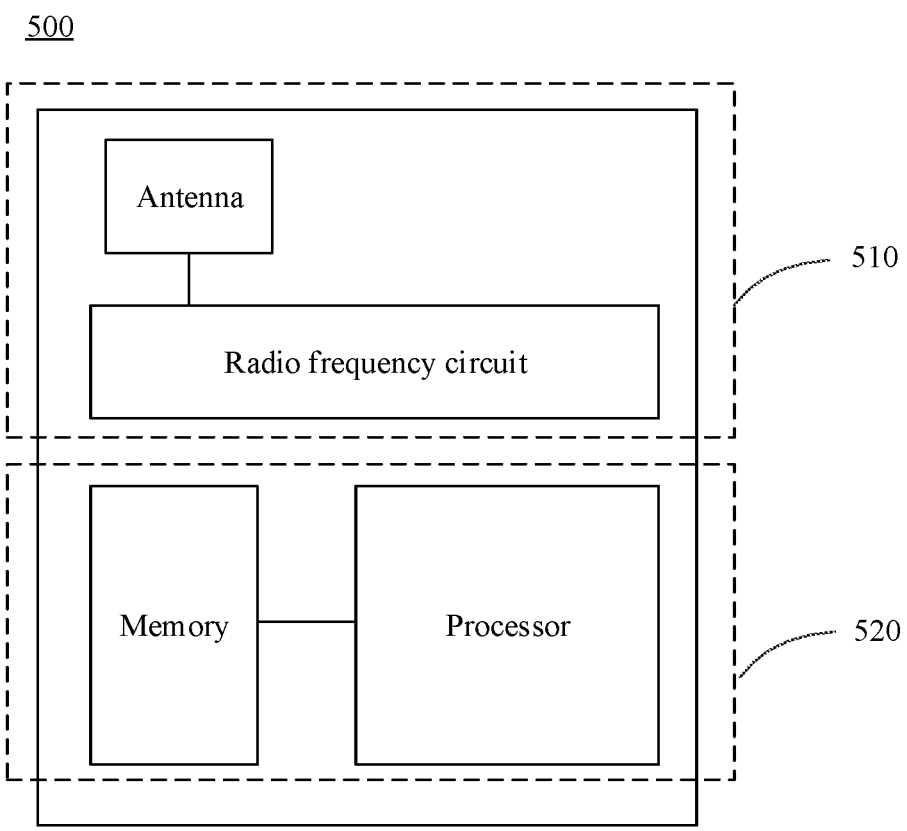
FIG. 5 is a schematic diagram of a structure of an example of a network device according to this application.

The following describes in detail apparatuses provided in embodiments of this application with reference to FIG. 3 to FIG. 5.

FIG. 3 is a schematic block diagram of a communication apparatus according to an embodiment of this application. As shown in FIG. 3, the communication apparatus 300 may include a processing unit 310 and a transceiver unit 320.

In a possible design, the communication apparatus 300 may correspond to the terminal device in the foregoing method embodiment, or the chip configured (or used) in the terminal device.

It should be understood that the communication apparatus 300 may correspond to the terminal device in the method 200 according to embodiments of this application, and the communication apparatus 300 may include units configured to perform the method performed by the terminal device in the method 200 in FIG. 2. In addition, the units in the communication apparatus 300 and the foregoing other operations and/or functions are respectively used to implement corresponding procedures of the method 200 in FIG. 2.

It should be further understood that when the communication apparatus 300 is the chip configured (or used) in the terminal device, the transceiver unit 320 in the communication apparatus 300 may be an input/output interface or a circuit in the chip, and the processing unit 310 in the communication apparatus 300 may be a processor in the chip.

Optionally, the communication apparatus 300 may further include the processing unit 310, and the processing unit 310 may be configured to process instructions or data, to implement a corresponding operation.

Optionally, the communication apparatus 300 may further include a storage unit 330. The storage unit 330 may be configured to store instructions or data. The processing unit 310 may execute the instructions or data stored in the storage unit, so that the communication apparatus implements a corresponding operation. The transceiver unit 320 in the communication apparatus 300 may correspond to a transceiver 410 in a terminal device 400 shown in FIG. 4, and the storage unit 330 may correspond to a memory in the terminal device 400 shown in FIG. 4.

It should be understood that a specific process in which the units perform the foregoing corresponding steps has been described in detail in the foregoing method embodiments. For brevity, details are not described herein again.

It should be further understood that when the communication apparatus 300 is the terminal device, the transceiver unit 320 in the communication apparatus 300 may be implemented through a communication interface (for example, a transceiver or an input/output interface), for example, may correspond to the transceiver 410 in the terminal device 400 shown in FIG. 4, the processing unit 310 in the communication apparatus 300 may be implemented through at least one processor, for example, may correspond to a processor 420 in the terminal device 400 shown in FIG. 4, and the processing unit 310 in the communication apparatus 300 may be implemented through at least one logic circuit.

In another possible design, the communication apparatus 300 may correspond to the network device that manages the serving cell in the foregoing method embodiment, or the chip configured (or used) in the network device.

It should be understood that the communication apparatus 300 may correspond to the network device in the method 200 according to embodiments of this application, and the communication apparatus 300 may include units configured to perform the method performed by the network device in the method 200 in FIG. 2. In addition, the units in the communication apparatus 300 and the foregoing other operations and/or functions are respectively used to implement corresponding procedures of the method 200 in FIG. 2.

It should be further understood that when the communication apparatus 300 is the chip configured (or used) in the network device, the transceiver unit in the communication apparatus 300 is an input/output interface or a circuit in the chip, and the processing unit 310 in the communication apparatus 300 may be a processor in the chip.

Optionally, the communication apparatus 300 may further include the processing unit 310, and the processing unit 310 may be configured to process instructions or data, to implement a corresponding operation.

Optionally, the communication apparatus 300 may further include a storage unit 330. The storage unit may be configured to store instructions or data. The processing unit may execute the instructions or data stored in the storage unit 330, so that the communication apparatus implements a corresponding operation. The storage unit 330 in the communication apparatus 300 may correspond a memory in a network device 500 shown in FIG. 5.

It should be understood that a specific process in which the units perform the foregoing corresponding steps has been described in detail in the foregoing method embodiments. For brevity, details are not described herein again.

It should be further understood that when the communication apparatus 300 is the network device, the transceiver unit 320 in the communication apparatus 300 may be implemented through a communication interface (for example, a transceiver or an input/output interface), for example, may correspond to a transceiver 510 in the network device 500 shown in FIG. 5, the processing unit 310 in the communication apparatus 300 may be implemented through at least one processor, for example, may correspond to a processor 520 in the network device 500 shown in FIG. 5, and the processing unit 310 in the communication apparatus 300 may be implemented through at least one logic circuit.

FIG. 4 is a schematic structural diagram of a terminal device 400 according to an embodiment of this application. The terminal device 400 may be applied to the system shown in FIG. 1, to perform a function of the terminal device in the foregoing method embodiments. As shown in the figure, the terminal device 400 includes a processor 420 and a transceiver 410. Optionally, the terminal device 400 further includes a memory. The processor 420, the transceiver 410, and the memory may communicate with each other through an internal connection path, and transfer a control signal and/or a data signal. The memory is configured to store a computer program. The processor 420 is configured to execute the computer program in the memory, to control the transceiver 410 to send and receive a signal.

The processor 420 and the memory may be integrated into a processing apparatus, and the processor 420 is configured to execute program code stored in the memory to implement the foregoing function. During specific implementation, the memory may also be integrated into the processor 420, or may be independent of the processor 420. The processor 420 may correspond to the processing unit in FIG. 3.

The transceiver 410 may correspond to the transceiver unit in FIG. 3. The transceiver 410 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 400 shown in FIG. 4 can implement processes related to the terminal device in the method embodiment shown in FIG. 2. Operations and/or functions of modules in the terminal device 400 are respectively used to implement corresponding procedures in the foregoing method embodiments. For details, refer to the descriptions in the foregoing method embodiments. To avoid repetition, detailed descriptions are appropriately omitted herein.

The processor 420 may be configured to perform an action that is implemented inside the terminal device and that is described in the foregoing method embodiments. The transceiver 410 may be configured to perform a sending action by the terminal device for the network device or a receiving action from the network device in the foregoing method embodiments. For details, refer to the descriptions in the foregoing method embodiments. Details are not described herein again.

Optionally, the terminal device 400 may further include a power supply, configured to supply power to various components or circuits in the terminal device.

In addition, to improve the function of the terminal device, the terminal device 400 may further include one or more of an input unit, a display unit, an audio circuit, a camera, a sensor, and the like. The audio circuit may further include a speaker, a microphone, and the like.

FIG. 5 is a schematic structural diagram of a network device according to an embodiment of this application. The network device 500 may be applied to the system shown in FIG. 1, to perform a function of the network device in the foregoing method embodiments. For example, FIG. 5 may be a schematic diagram of a related structure of the network device.

It should be understood that the network device 500 shown in FIG. 5 can implement processes related to the network device in the method embodiment shown in FIG. 2. Operations and/or functions of modules in the network device 500 are respectively used to implement corresponding procedures in the foregoing method embodiments. For details, refer to the descriptions in the foregoing method embodiments. To avoid repetition, detailed descriptions are appropriately omitted herein.

It should be understood that the network device 500 shown in FIG. 5 is merely a possible architecture of the network device, and should not constitute any limitation on this application. The method provided in this application is applicable to a network device of another architecture, for example, a network device including a CU, a DU, and an AAU. A specific architecture of the network device is not limited in this application.

An embodiment of this application further provides a processing apparatus. The processing apparatus includes a processor and an interface. The processor is configured to execute the method in any one of the foregoing method embodiments.

It should be understood that the processing apparatus may be one or more chips. In this application, the processing apparatus may be a field-programmable gate array (field programmable gate array, FPGA), an application-specific integrated circuit (application-specific integrated circuit, ASIC), a system on chip (system on chip, SoC), or a central processing unit (central processor unit, CPU), a network processor (network processor, NP), a digital signal processor (digital signal processor, DSP), a micro controller unit (micro controller unit, MCU), or a programmable logic device (programmable logic device, PLD) or another integrated chip.

According to the method provided in embodiments of this application, this application further provides a computer program product. The computer program product includes computer program code. When the computer program code is executed by one or more processors, an apparatus including the processor is enabled to perform the method in the embodiment shown in FIG. 2.

According to the method provided in embodiments of this application, this application further provides a computer-readable storage medium. The computer-readable storage medium stores program code. When the program code is run by one or more processors, an apparatus including the processor is enabled to perform the method in the embodiment shown in FIG. 2.

According to the method provided in embodiments of this application, this application further provides a system. The system includes the foregoing one or more network devices. The system may further include the foregoing one or more terminal devices.

The network device and the terminal device in the foregoing apparatus embodiments completely correspond to the network device and the terminal device in the method embodiments. Corresponding modules or units perform corresponding steps. For example, a communication unit (transceiver) performs a receiving or sending step in the method embodiments. Other steps except the receiving or sending step may be performed by a processing unit (processor). For functions of specific units, refer to the corresponding method embodiments. There may be one or more processors.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device from a first cell, first information comprising first indication information corresponding to a first service in a second cell, wherein the first indication information is used to indicate that second configuration information corresponding to the first service in the second cell is the same as or different from first configuration information corresponding to the first service in the first cell; and
   receiving, by the terminal device based on the first information, data of the first service provided by the second cell;
   wherein the second configuration information corresponding to the first service in the second cell comprises N pieces of sub-configuration information, the first indication information further comprises N pieces of sub-indication information corresponding to the N pieces of sub-configuration information, each piece of sub-indication information corresponding to one of the N pieces of sub-configuration information is used to indicate that the piece of sub-configuration information in the second cell is the same as or different from a piece of sub-configuration information of the first configuration information in the first cell, N is a quantity of pieces of sub-configuration information.

2. The method according to claim 1, wherein
   the receiving, by the terminal device based on the first information, the data of the first service provided by the second cell comprises:
   when the first indication information indicates that the second configuration information is the same as the first configuration information, receiving, by the terminal device based on the first configuration information, the data of the first service provided by the second cell;
   when the first indication information indicates that the second configuration information is different from the first configuration information, and the first information comprises the second configuration information, receiving, by the terminal device based on the second configuration information, the data of the first service provided by the second cell; or
   when the first indication information indicates that the second configuration information is different from the first configuration information, and the first information does not comprise the second configuration information, receiving, by the terminal device, the second configuration information from the second cell, and receiving the data of the first service provided by the second cell.

3. The method according to claim 1, wherein the first information comprises the second configuration information corresponding to the first service in the second cell.

4. The method according to claim 1, wherein the first indication information comprises a first bit string having one or more bits, with each of the one or more bits corresponding to one or more neighboring cells of the first cell and indicating that third configuration information corresponding to the first service in the one or more neighboring cells is the same as or different from the first configuration information, the one or more neighboring cells comprising the second cell.

5. The method according to claim 4, wherein the first information is carried in transmission channel information from the first cell, the transmission channel information further comprises second information indicating M neighboring cells that provide the first service, the M neighboring cells comprise the one or more neighboring cells.

6. The method according to claim 1, wherein the first indication information comprises at least one of the following:
   a second bit string having one or more bit fields, with each bit field comprising multiple bits corresponding to respective N pieces of sub-configuration information of third configuration information of one or more neighboring cells of the first cell and indicating that the respective N pieces of sub-configuration information of third configuration information of the one or more neighboring cells are the same as or different from N pieces of sub-configuration information of the first configuration information of the first cell, the one or more neighboring cells comprising the second cell;
   wherein N is a quantity of pieces of sub-configuration information.

7. The method according to claim 1, wherein the second configuration information corresponding to the first service comprises one or more of the following:
   a first group radio network temporary identifier (G-RNTI) corresponding to the first service;
   scheduling information of a control channel of the first service; or
   scheduling information of a transmission channel of the first service.

8. The method according to claim 1, wherein the terminal device is in an idle state or in an inactive state.

9. A communication method, comprising:
   sending, by a network device of a first cell to a terminal device, first information that comprises first indication information corresponding to a first service in a second cell, wherein the first indication information indicates that second configuration information corresponding to the first service in the second cell is the same as or different from first configuration information corresponding to the first service in the first cell,
   wherein the second configuration information corresponding to the first service in the second cell comprises N pieces of sub-configuration information, the first indication information further comprises N pieces of sub-indication information corresponding to the N pieces of sub-configuration information, each piece of sub-indication information corresponding to one of the N pieces of sub-configuration information and indicating that the piece of sub-configuration information in the second cell is the same as or different from a piece of sub-configuration information of the first configuration information in the first cell, N is a quantity of pieces of sub-configuration information.

10. The method according to claim 9, wherein the first information comprises the second configuration information corresponding to the first service in the second cell.

11. The method according to claim 9, wherein the first indication information comprises a first bit string having one or mor bits, with each of the one or more bits corresponding to one or more neighboring cells of the first cell and indicating that third configuration information corresponding to the first service in the one or more neighboring cells is the same as or different from the first configuration information, the one or more neighboring cells comprising the second cell.

12. The method according to claim 11, wherein the first information is carried in transmission channel information sent by the network device, the transmission channel information further comprises second information indicating M neighboring cells that provide the first service, the M neighboring cells comprise the one or more neighboring cells.

13. The method according to claim 9, wherein the second configuration information corresponding to the first service in the second cell comprises N pieces of sub-configuration information, the first indication information comprises at least one of the following:
   a second bit string having one or more bit fields, with each bit field comprising multiple bits corresponding to respective N pieces of sub-configuration information of third configuration information of one or more neighboring cells of the first cell and indicating that the respective N pieces of sub-configuration information of the one or more neighboring cells are the same as or different from N pieces of sub-configuration information of the first cell, the one or more neighboring cells comprising the second cell.

14. The method according to claim 9, wherein the second configuration information corresponding to the first service comprises one or more of the following:
   a first group radio network temporary identifier (G-RNTI) corresponding to the first service;
   scheduling information of a control channel of the first service; or
   scheduling information of a transmission channel of the first service.

15. A communication apparatus, comprising:
   at least one processor, and
   a memory coupled to the at least one processor and configured to store a program, the program comprising instructions that, when executed by the at least one processor, cause the communication apparatus to perform the following operations:
   receiving first information from a first cell, wherein the first information comprising first indication information corresponding to a first service in a second cell and indicating that second configuration information corresponding to the first service in the second cell is the same as or different from first configuration information corresponding to the first service in the first cell; and
   receiving data of the first service provided by the second cell in accordance with the first information;
   wherein the second configuration information corresponding to the first service in the second cell comprises N pieces of sub-configuration information, the first indication information further comprises N pieces of sub-indication information corresponding to the N pieces of sub-configuration information, each piece of sub-indication information corresponding to one of the N pieces of sub-configuration information is used to indicate that the piece of sub-configuration information in the second cell is the same as or different from a piece of sub-configuration information of the first configuration information in the first cell, N is a quantity of pieces of sub-configuration information.

16. The apparatus according to claim 15, wherein the first information comprises the second configuration information corresponding to the first service in the second cell.

17. The apparatus according to claim 15, wherein the first indication information comprises at least one of the following:
   a first bit string having one or more bits, with each of the one or more bits corresponding to one or more neighboring cells of the first cell and indicating that third configuration information corresponding to the first service in the one or more neighboring cells is the same as or different from the first configuration information, the one or more neighboring cells comprising the second cell; or
   a second bit string having one or more bit fields, with each bit field comprising multiple bits corresponding to respective N pieces of sub-configuration information of the third configuration information of the third configuration information of the one or more neighboring cells of the first cell and indicating that the respective N pieces of sub-configuration information of the third configuration information of the third configuration information of the one or more neighboring cells are the same as or different from N pieces of sub-configuration information of the first cell.

18. The apparatus according to claim 15, wherein the second configuration information corresponding to the first service comprises one or more of the following:
   a first group radio network temporary identifier (G-RNTI) corresponding to the first service;
   scheduling information of a control channel of the first service; or
   scheduling information of a transmission channel of the first service.

* * * * *